US010096118B2

(12) United States Patent
Huang et al.

(10) Patent No.: US 10,096,118 B2
(45) Date of Patent: *Oct. 9, 2018

(54) METHOD AND SYSTEM FOR IMAGE PROCESSING TO CLASSIFY AN OBJECT IN AN IMAGE

(71) Applicant: Futurewei Technologies, Inc., Plano, TX (US)

(72) Inventors: Yu Huang, Sunnyvale, CA (US); Hongbing Li, Skillman, NJ (US); Jun Tian, Belle Mead, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/990,441

(22) Filed: Jan. 7, 2016

(65) Prior Publication Data
US 2016/0117835 A1 Apr. 28, 2016

Related U.S. Application Data

(63) Continuation of application No. 12/686,902, filed on Jan. 13, 2010, now Pat. No. 9,269,154.
(Continued)

(51) Int. Cl.
*G06K 9/32* (2006.01)
*G06T 7/00* (2017.01)
(Continued)

(52) U.S. Cl.
CPC .......... *G06T 7/0081* (2013.01); *G06K 9/3241* (2013.01); *G06K 9/4642* (2013.01);
(Continued)

(58) Field of Classification Search
CPC ......... G06T 7/0081; G06T 7/194; G06T 7/11; G06T 2207/10024; G06T 2207/30221;
(Continued)

(56) References Cited

U.S. PATENT DOCUMENTS 5,638,465 A 6/1997 Sano et al.
5,961,571 A 10/1999 Gorr et al.
(Continued)

FOREIGN PATENT DOCUMENTS

CN 1991864 A 7/2007
CN 101079109 A 11/2007
(Continued)

OTHER PUBLICATIONS

First Office Action of Chinese Application No. 201080003841.8, dated Jan. 17, 2013, 14 pages. (Partial Translation).
(Continued)

*Primary Examiner* — Mia M Thomas
(74) *Attorney, Agent, or Firm* — Slater Matsil, LLP

(57) ABSTRACT

In an image processing method, an object is located within an image. An area around the object is determined and divided into at least first and second portions based upon image information within the area. The object can then be classified based upon both image information in the first portion of the area and image information in the second portion of the area.

21 Claims, 6 Drawing Sheets

Related U.S. Application Data

(60) Provisional application No. 61/144,380, filed on Jan. 13, 2009, provisional application No. 61/144,386, filed on Jan. 13, 2009.

(51) Int. Cl.

| | | |
|---|---|---|
| *G06K 9/46* | (2006.01) | |
| *H04N 21/643* | (2011.01) | |
| *H04N 21/8545* | (2011.01) | |
| *G06K 9/62* | (2006.01) | |
| *H04N 21/234* | (2011.01) | |
| *H04N 21/236* | (2011.01) | |
| *H04N 21/4725* | (2011.01) | |
| *G06T 7/11* | (2017.01) | |
| *G06T 7/194* | (2017.01) | |

(52) U.S. Cl.
CPC ......... *G06K 9/4652* (2013.01); *G06K 9/6267* (2013.01); *G06T 7/11* (2017.01); *G06T 7/194* (2017.01); *H04N 21/23418* (2013.01); *H04N 21/23614* (2013.01); *H04N 21/4725* (2013.01); *H04N 21/64322* (2013.01); *H04N 21/8545* (2013.01); *G06T 2207/10024* (2013.01); *G06T 2207/30221* (2013.01)

(58) Field of Classification Search
CPC .. G06K 9/3241; G06K 9/4642; G06K 9/4652; G06K 9/6267; H04N 21/23418; H04N 21/23614; H04N 21/4725; H04N 21/64322; H04N 21/8545
See application file for complete search history.

(56) References Cited

U.S. PATENT DOCUMENTS

| | | | |
|---|---|---|---|
| 6,360,008 | B1 | 3/2002 | Suzuki et al. |
| 6,363,160 | B1 | 3/2002 | Bradski et al. |
| 6,587,576 | B1 | 7/2003 | Wesolkowski |
| 6,587,593 | B1 | 7/2003 | Matsuoka et al. |
| 6,798,897 | B1 | 9/2004 | Rosenberg |
| 6,870,945 | B2 | 3/2005 | Schoepflin |
| 7,251,364 | B2 | 7/2007 | Tomita, Jr. et al. |
| 7,457,440 | B2 | 11/2008 | Scott et al. |
| 7,542,608 | B2 | 6/2009 | Yeh |
| 7,921,036 | B1 | 4/2011 | Sharma et al. |
| 8,064,716 | B2 | 11/2011 | Shaw |
| 8,081,846 | B2 | 12/2011 | Ignatchenko et al. |
| 8,218,077 | B2 | 7/2012 | Kondo et al. |
| 8,249,343 | B2 | 8/2012 | Perronnin et al. |
| 8,363,884 | B2 | 1/2013 | Amsterdam et al. |
| 8,391,547 | B2 | 3/2013 | Huang et al. |
| 8,456,528 | B2 | 6/2013 | Brown et al. |
| 8,532,336 | B2 | 9/2013 | Bobbitt et al. |
| 8,542,872 | B2 | 9/2013 | Gornick et al. |
| 8,587,666 | B2 | 11/2013 | Albu et al. |
| 8,588,465 | B2 | 11/2013 | Geiss |
| 8,687,918 | B2 | 4/2014 | Tamura |
| 8,705,894 | B2 | 4/2014 | Albu et al. |
| 8,718,363 | B2 | 5/2014 | Desai et al. |
| 8,731,304 | B2 | 5/2014 | Baba |
| 9,269,154 | B2 * | 2/2016 | Huang ............. H04N 21/64322 |
| 9,390,506 | B1 * | 7/2016 | Asvatha Narayanan .................... G06T 7/194 |
| 9,681,125 | B2 * | 6/2017 | Wang .................... H04N 19/17 |
| 9,881,380 | B2 * | 1/2018 | Sorkine Hornung ........................ G06K 9/00718 |
| 9,898,677 | B1 * | 2/2018 | An jelkovi .......... G06K 9/3241 |
| 2002/0028021 | A1 | 3/2002 | Foote et al. |
| 2002/0031256 | A1 | 3/2002 | Hiramatsu et al. |
| 2002/0085096 | A1 | 7/2002 | Mertens |
| 2002/0140813 | A1 | 10/2002 | Trajkovic et al. |
| 2002/0168091 | A1 | 11/2002 | Trajkovic |
| 2002/0172417 | A1 | 11/2002 | Nicolas |
| 2003/0056799 | A1 | 3/2003 | Young et al. |
| 2003/0095709 | A1 | 5/2003 | Zhou et al. |
| 2003/0107649 | A1 | 6/2003 | Flickner et al. |
| 2003/0169921 | A1 | 9/2003 | Yamamoto |
| 2004/0001612 | A1 | 1/2004 | Gutta |
| 2004/0040041 | A1 | 2/2004 | Crawford |
| 2004/0126038 | A1 | 7/2004 | Aublant et al. |
| 2005/0013486 | A1 | 1/2005 | Wiedemann et al. |
| 2005/0069225 | A1 | 3/2005 | Schneider et al. |
| 2005/0100204 | A1 | 5/2005 | Afzal et al. |
| 2005/0145791 | A1 | 7/2005 | Fujita et al. |
| 2005/0220348 | A1 | 10/2005 | Chiu et al. |
| 2005/0271269 | A1 | 12/2005 | Errico et al. |
| 2005/0286759 | A1 | 12/2005 | Zitnick et al. |
| 2006/0018516 | A1 | 1/2006 | Masoud et al. |
| 2006/0114480 | A1 | 6/2006 | Chang et al. |
| 2006/0265232 | A1 | 11/2006 | Katariya et al. |
| 2006/0280335 | A1 | 12/2006 | Tomita, Jr. et al. |
| 2006/0280363 | A1 | 12/2006 | Umeda |
| 2006/0288291 | A1 | 12/2006 | Lee et al. |
| 2006/0290780 | A1 | 12/2006 | Porikli |
| 2006/0291696 | A1 | 12/2006 | Shao et al. |
| 2007/0003164 | A1 | 1/2007 | Takata |
| 2007/0016999 | A1 * | 1/2007 | Harber ............... A41D 13/0015 2/69 |
| 2007/0064974 | A1 | 3/2007 | Ayachitula et al. |
| 2007/0098257 | A1 | 5/2007 | Shah et al. |
| 2007/0104384 | A1 | 5/2007 | Shaw |
| 2007/0154066 | A1 | 7/2007 | Lin et al. |
| 2007/0183661 | A1 | 8/2007 | El-Maleh et al. |
| 2007/0183662 | A1 | 8/2007 | Wang |
| 2007/0250901 | A1 | 10/2007 | McIntire et al. |
| 2008/0032797 | A1 | 2/2008 | Harris et al. |
| 2008/0050015 | A1 | 2/2008 | Lu et al. |
| 2008/0056568 | A1 | 3/2008 | Porikli |
| 2008/0089581 | A1 | 4/2008 | Pitie et al. |
| 2008/0101652 | A1 | 5/2008 | Zhao et al. |
| 2008/0144931 | A1 | 6/2008 | Yan et al. |
| 2008/0201116 | A1 | 8/2008 | Ozdemir et al. |
| 2008/0298571 | A1 | 12/2008 | Kurtz et al. |
| 2008/0304735 | A1 | 12/2008 | Yang et al. |
| 2009/0016643 | A1 | 1/2009 | Johnson |
| 2009/0034932 | A1 | 2/2009 | Oisel et al. |
| 2009/0060352 | A1 | 3/2009 | Distante et al. |
| 2009/0110236 | A1 | 4/2009 | Huang |
| 2009/0141949 | A1 | 6/2009 | Lee et al. |
| 2009/0153744 | A1 | 6/2009 | Morita et al. |
| 2009/0220070 | A1 | 9/2009 | Picard et al. |
| 2009/0225183 | A1 | 9/2009 | Tamura |
| 2009/0238406 | A1 | 9/2009 | Huang et al. |
| 2009/0238549 | A1 | 9/2009 | Atsushi |
| 2009/0257649 | A1 | 10/2009 | Yamauchi et al. |
| 2009/0262217 | A1 | 12/2009 | Mack et al. |
| 2009/0317061 | A1 | 12/2009 | Jung et al. |
| 2010/0026809 | A1 | 2/2010 | Curry |
| 2010/0027845 | A1 | 2/2010 | Kim |
| 2010/0027846 | A1 | 2/2010 | Xu |
| 2010/0066667 | A1 | 3/2010 | MacDougall et al. |
| 2010/0098307 | A1 | 4/2010 | Huang et al. |
| 2010/0134614 | A1 | 6/2010 | Aman |
| 2010/0177194 | A1 | 7/2010 | Huang et al. |
| 2010/0177969 | A1 | 7/2010 | Huang et al. |
| 2010/0214472 | A1 | 8/2010 | Tomonaga |
| 2011/0013836 | A1 | 1/2011 | Gefen et al. |
| 2011/0044538 | A1 | 2/2011 | Vanderhoff |
| 2011/0107370 | A1 | 5/2011 | Cassanova et al. |
| 2011/0142289 | A1 | 6/2011 | Barenbrug |
| 2011/0216167 | A1 | 9/2011 | Katz |
| 2011/0291925 | A1 | 12/2011 | Israel et al. |
| 2011/0310100 | A1 | 12/2011 | Adimatyam et al. |
| 2012/0062700 | A1 | 3/2012 | Antonellis et al. |
| 2012/0106837 | A1 | 5/2012 | Partis |
| 2012/0121174 | A1 | 5/2012 | Bhagavathy et al. |
| 2012/0170803 | A1 | 7/2012 | Millar |
| 2012/0213438 | A1 | 8/2012 | Quan |
| 2013/0170557 | A1 * | 7/2013 | Wang ..................... H04N 19/00 375/240.24 |
| 2013/0336535 | A1 | 12/2013 | Bobbin et al. |
| 2014/0056473 | A1 | 2/2014 | Tojo |

(56) References Cited

U.S. PATENT DOCUMENTS

| | | | |
|---|---|---|---|
| 2014/0074263 A1 | 3/2014 | Balakrishnan et al. | |
| 2014/0254881 A1 | 9/2014 | Jin | |
| 2015/0221069 A1* | 8/2015 | Shaburova | G06T 5/005 382/167 |
| 2015/0310370 A1* | 10/2015 | Burry | G06K 9/00785 705/7.26 |
| 2015/0310624 A1* | 10/2015 | Bulan | G06K 9/66 382/103 |
| 2016/0078279 A1* | 3/2016 | Pitre | A61B 5/7264 382/118 |
| 2016/0217338 A1* | 7/2016 | Li | G06K 9/00765 |
| 2016/0275375 A1* | 9/2016 | Kant | G06K 9/4604 |
| 2017/0039432 A1* | 2/2017 | Bulan | H04N 5/23229 |
| 2017/0075993 A1* | 3/2017 | Matsushita | G06F 17/30793 |
| 2017/0236290 A1* | 8/2017 | Sorkine Hornung | G06T 7/0081 382/173 |
| 2017/0278289 A1* | 9/2017 | Marino | G06T 11/60 |

FOREIGN PATENT DOCUMENTS

| | | |
|---|---|---|
| CN | 101243448 A | 8/2008 |
| CN | 101287056 A | 10/2008 |
| WO | 2008118147 A2 | 10/2008 |
| WO | 2008139399 A3 | 11/2008 |

OTHER PUBLICATIONS

Avidan, S., "Ensemble Tracking," Mitsubishi Electric Research Laboratories, TR2005-065, CVPR, Jun. 2005, 9 pages.

Babu, R. V., et al., "Robust Tracking with Motion Estimation and Kernel-Based Color Modelling," IEEE, ICOP'05, 2005, 4 pages.

Balfanz, D., et al., "Interaction with Content-Augmented Video Via Off-Screen Hyperlinks for Direct Information Retrieval," The 10-th Int. Conf. in Central Europe on Computer Graphics, Visualization and Computer Vision, Czech Republic, Feb. 4-8, 2002, 8 pages.

Barnard, M., et al., "Robust Playfield Segmentation using MAP Adaptation," ICPR'04, 2004, 4 pages.

Beetz, M., et al., "Camera-based Observation of Football Games for Analyzing Multi-agent Activities," Proc. of Int. Joint Conf. on Autonomous Agents and Multiagent Systems, Japan, 2006, 8 pages.

Beetz, et al., "Visually Tracking Football Games Based on TV Broadcasts," (2007) Proceedings of the Twentieth International Joint Conference on Artificial Intelligence (IJCAI), pp. 2066-2017.

Black, M. J., et al., "EigenTracking: Robust Matching and Tracking of Articulated Objects Using a View-Based Representation," EECV'96, 1996, 14 pages.

Bradski, G. R., "Computer Vision Face Tracking for Use in a Perceptual User Interface," IEEE Workshop on Applications of Computer Vision, 1998, 15 pages.

Choi, S., et al., "Where are the ball and players?: Soccer Game Analysis with Color-based Tracking and Image Mosaick," Int. Conf. on Image Analysis and Processing, Sep. 1997, 15 pages.

Issue document received in CN 102576412, dated Nov. 5, 2014, 18 pgs.

Chinese Office Action received in Application No. 201080003841.8 dated Aug. 16, 2013, 5 pages.

Chinese Search Report received in Application No. 2010800038418 dated Aug. 8, 2013, 3 pages.

Collins, R., "Mean-Shift Blob Tracking through Scale Space," CVPR'03, 2003, 7 pages.

Collins, R. T., et al., "On-Line Selection of Discriminative Tracking Features," CVPR'03, 2003, 14 pages.

Comaniciu, D., et al., "Kernel-Based Object Tracking," IEEE Transactions on Pattern Analysis and Machine Intelligence, vol. 25, Issue 5, May 2003, 30 pages.

Gillet, A., et al., "Color image segmentation by analysis of 3D histogram with fuzzy morphological filters," Chapter in the book: "Fuzzy filters for image processing—Studies in fuzziness and soft computing," Springer-Verlag Editor, 25 pages, 2002.

Gomez, et al., "Detection and Classification of Football Players with Automatic Generation of Models," Optical Engineering 49(1), Jan. 2010, pp. 1-17.

Hager, G. D., et al., "Multiple Kernel Tracking with SSD," CVPR'04, 2004, 8 pages.

Huang, Y., et al., "A Method of Small Object Detection and Tracking Based on Particle Filters," ICPR'08, 2008, Florida, Dec. 2008, 4 pages.

Huang, Y., "Player Highlighting and Team Classification in Broadcast Soccer Videos for the Next Generation TV," WOCC'09, 2009, 27 pages.

Huang, Y., et al., "Players and Ball Detection in Soccer Videos Based on Color Segmentation and Shape Analysis,," Int. Workshop on Multimedia Content Analysis and Mining (MCAM'07), Jun. 2007, 10 pages.

International Search Report and Written Opinion, International Application No. PCT/US2010/020927, dated May 4, 2010, 12 pages.

Jepson, A. D., et al., "Robust Online Appearance Models for Visual Tracking," IEEE Conference on Computer Vision and Pattern Recognition, Kauai, 2001, vol. 1, pp. 415-422.

Kaneko, T., et al., "Template Update Criterion for Template Matching of Image Sequences," ICPR'02, IEEE, 2002, 5 pages.

Lim, J., et al., "Incremental Learning for Visual Tracking," MIT Press, 2005, 8 pages.

Liu, J., et al., "Automatic Player Detection, Labeling and Tracking in Broadcast Soccer Video," European Conference on Computer Vision, 2007, 10 pages.

Matthews, L, et al., "The Template Update Problem," The Robotics Institute, Carnegie Mellon University, IEEE T-PAMI, 26(6), 2004, 16 pages.

Muselet, D., et al., "Color person image indexing and retrieval," Machine Graphics and Vision, vol. 11, No. 2/3, 21 pages, 2002.

Nguyen, H. T., et al., "Fast Occluded Object Tracking by a Robust Appearance Filter," IEEE Transactions on Pattern Analysis and Machine Intelligence, vol. 26, No. 8, Aug. 2004, 6 pages.

Porikli, F., et al., "Object Tracking in Low-Frame-Rate Video," SPIE Image and Video Communications and Processing, vol. 5685, Mar. 2005, 10 pages.

Rakotomalala, V., et al., "Identification of retinal vessels by color image analysis," Machine Graphics and Vision, vol. 7, No. 4, 23 pages, 1998.

Rees, D., et al., "CLICK-IT: Interactive Television Highlighter for Sports Action Replay," Fourteenth International Conference on Pattern Recognition, 1998, 4 pages.

Rittscher, J., et al., "A Probabilistic Background Model for Tracking," ECCV'00, 2000, 15 pages.

Spagnolo, P., et al., "Unsupervised Algorithms for Segmentation and Clustering Applied to Soccer Players Classification," Int. Conf. on Signal Processing and Multimedia Applications, Barcelona, Jul. 2007, pp. 129-134.

Tong, X-F., et al., "An Effective and Fast Soccer Ball Detection and Tracking Method," Proceedings of the 17th International Conference on Pattern Recognition (ICPR'04), 4 pages.

Ultré, V., et al., "Determination of compatibility coefficients for color edge detection by relaxation," Proc. of the IEEE Int. Conf. on Image Processing (ICIP 96), vol. 3 Lausanne (Suisse), 5 pages, 1996.

Utsumi, O., et al., "An Object Detection Method for Describing Soccer Games from Video," IEEE ICME'02, 2002, 4 pages.

Vandenbroucke, N., et al., "Color image segmentation by pixel classification in an adapted hybrid color space. Application to soccer image analysis," Computer Vision and Image Understanding, vol. 90, No. 2, 27 pages, 2003.

Vanderbroucke, et al., "Color Pixels Classification in Hybrid Space," IEEE (1998), pp. 1-5.

Xu, M., et al., "Tracking Football Players with Multiple Cameras," ICIP 2004, 4 pages.

Yilmaz, A., "Object Tracking by Asymmetric Kernel Mean Shift with Automatic Scale and Orientation Selection," CVPR'07, IEEE, 2007, 6 pages.

(56) References Cited

OTHER PUBLICATIONS

Yin, Z., et al., "Spatial Divide and Conquer with Motion Cues for Tracking through Clutter," IEEE CVPR'06, Jun. 2006, 8 pages.
Yu, X., et al., "Trajectory-Based Ball Detection and Tracking with Applications to Semantic Analysis of Broadcast Soccer Video," ACM Multimedia, 2003, pp. 11-20.
Zhang, H., et al., "Affine Object Tracking with Kernel-based Spatial-Color Representation," CVPR'05, 2005, 8 pages.
Zivkovic, Z., et al., "An EM-like algorithm for color-histogram-based object tracking," CVPR'04, 2004, pp. 798-803.

* cited by examiner

METHOD AND SYSTEM FOR IMAGE PROCESSING TO CLASSIFY AN OBJECT IN AN IMAGE

This is a continuation application of U.S. patent application Ser. No. 12/686,902, entitled "Player Team Classification-Based Interactive Service for Soccer Game Programs in an IPTV System" which was filed on Jan. 13, 2010, which application claims the benefit of U.S. Provisional Application No. 61/144,380, filed on Jan. 13, 2009, entitled "Player Team Classification-Based Interactive Service for Sports Game Programs in an IPTV System" and also claims the benefit of U.S. Provisional Application No. 61/144,386, filed on Jan. 13, 2009, entitled "A Semi-Supervised Method For Learning and On-Line Updating Playfield Model in Sports Videos." All three of these applications are incorporated herein by reference in their entireties.

TECHNICAL FIELD

The present invention relates generally to image processing, and in particular embodiments, to a method and system for image processing to classify an object in an image.

BACKGROUND

Systems and methods have been developed for defining an object in video and for tracking that object through the frames of the video. In various applications, a person may be the "object" to be tracked. For example, sports images are interested in following the actions of a person such as the players and/or the referees.

Players and referees are displayed in sports videos. Localization and labeling of them can be done in IPTV systems so that a regular TV broadcast (MPEG-2/-4) is augmented with additional information (MPEG-7 encoded) that defines those objects in the video, along with additional content to be displayed when they are selected. Specification of objects with additional content (metadata) is usually implemented by an authoring tool that includes such functions as extraction of shots and key frames, specification of the interactive regions, and tracking of the specified regions to get the region locations in all frames.

Team classification-based interactive services by clicking the player in hypervideo or iTV has been discussed. Team information search and retrieval and team data (statistics results, articles and other media) can be linked assuming the player can be localized by the interaction service system. Various methods for locating the players/referees can be split in two groups. The first group makes use of fixed cameras (usually they are calibrated in advance) in a controlled environment while the second group uses only regular broadcasting videos. While the former can provide better performance, the latter are more flexible. In the second group, some approaches tried to overcome difficulties by finding the playfield first, using color segmentation and post-processing with morphological operations, such as connected component analysis, in order to limit the search area.

SUMMARY OF THE INVENTION

In accordance with a first embodiment of the present invention, an image processing method is performed, e.g., on a processor. An object is located within an image, such as a video or still image. An area around the object is determined and divided into at least first and second portions based upon image information within the area. The object can then be classified based upon both image information in the first portion of the area and image information in the second portion of the area.

In another embodiment, an interactive television system includes an authoring tool configured to receive a video image, locate an object within the image, divide an area around the object into first and second portions; and generate metadata based upon first image information within the first portion and upon second image information within the second portion. An aggregator is configured to receive the video image and metadata and generate a video stream that is enhanced with the metadata and a delivery system is configured to transmit the video stream that is enhanced with the metadata.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
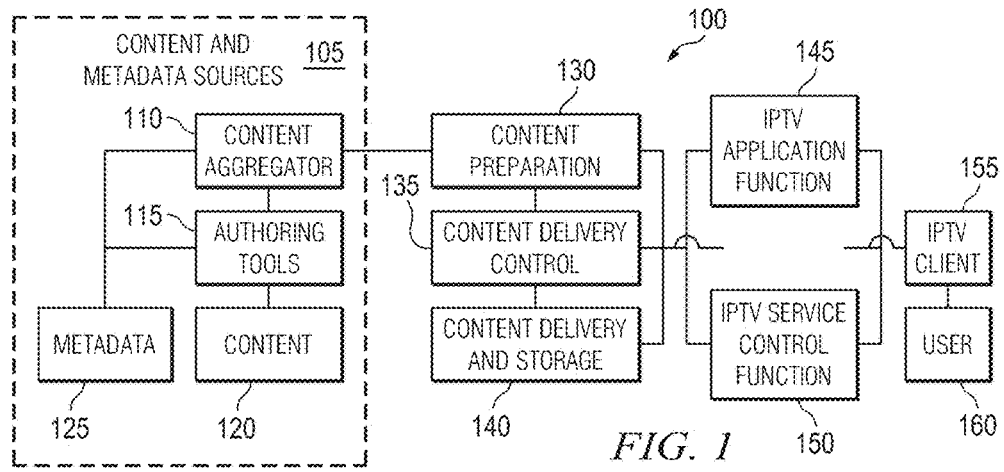
FIG. 1 illustrates a block diagram of a team classification-based interactive system, according to one embodiment of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Team classification of player/referee is used to distinguish their identities as Team A or Team B or Referee. Issues for this task include the selection of features and the clustering method for matching. Template and histogram methods have been used. Feature selection is based on discrimination of different classes, robustness and computational cost. Histograms are a good trade-off between these requisites. Clustering methods can be supervised or unsupervised. The present invention improves the efficiency of feature extraction and discrimination in histogram matching simultaneously.

In a first embodiment, the present invention discloses a sports team based interactive service for IPTV systems, including real time and on demand video delivery. For example, a sporting event video is processed and the team/referee visual objects are analyzed and categorized in real time. A multi-histogram matching scheme and a method for separating the player/referee blob (obtained by playfield model-based segmentation) into two parts (upper and lower) via a discriminate function are proposed. The proposed scheme achieves good classification accuracy with low computational complexity. The team classification-based interaction functions include team information search and retrieval and team data (statistics result, articles and other media) linking when the player is clicked. The proposed team classification method still has a promising potential usage in sporting events and tactics analysis as well as an interactive service for sports programs in IPTV systems.

In other embodiments, a proposed team classification-based interactive service for sports programs in an IPTV system is provided. In another embodiment, a method for team classification of player/referee in soccer game videos based on a multi-histogram matching scheme, which offers better classification accuracy with low computational complexity, is provided. In yet another embodiment, a method can be used to separate the player/referee blob (obtained by playfield model-based segmentation) into two parts (upper and lower) by a proposed discriminate function.

In hyperlinked video, objects are selectable resulting in an associated action, akin to linked rich media content about the objects of interest. Possible venues for hyperlinked video include broadcast TV, streaming video and published media such as DVD. Hyperlinked video offers new interaction possibilities with streaming media.

Interactive TV (iTV) is a popular application area of hyperlinked video with the convergence between broadcast and network communications. For example, the European GMF4iTV (Generic Media Framework for Interactive Television) project has developed such a system where active video objects are associated to metadata information, embedded in the program stream at production time and can be selected by the user at run time to trigger the presentation of their associated metadata. Another European PorTiVity (Portable Interactivity) project is developing and experimenting with a complete end-to-end platform providing Rich Media Interactive TV services for portable and mobile devices, realizing direct interactivity with moving objects on handheld receivers connected to DVB-H (broadcast channel) and UMTS (unicast channel).

IPTV (Internet Protocol Television) is a system where a digital television service is delivered using Internet Protocol over a network infrastructure, which may include delivery by a broadband connection. An IP-based platform also allows significant opportunities to make the TV viewing experience more interactive and personalized. Interactive TV services will be a key differentiator for the multitude of IPTV offerings that are emerging. Interactivity via a fast two-way connection will lift IPTV ahead of today's television.

Aspects of the present disclosure relate to a scenario related to a rich media interactive TV application, for example, an IPTV application. The focus is interaction with moving objects in sports programs. Based on direct interaction with certain objects, the TV viewer can retrieve and link rich media content about objects of interest. The term "television" or "TV" is used to denote any video image displayed to a user. For example, this image can be displayed on a computer screen, mobile device or an actual television and still be within the scope of the term television.

Players and referees are two examples of moving objects in sports videos. Localization and labeling of them is useful for interactive services in IPTV systems, so that a regular TV broadcast (MPEG-2/-4) is augmented with additional information (MPEG-7 encoded) which defines those objects in the video, along with additional content to be displayed when they are selected. Specification of objects with additional content (metadata) can be implemented by an authoring tool that includes such functions as extraction of shots and key frames, specification of the interactive regions, and tracking of the specified regions to get the region locations in all frames.

In embodiments of the present invention, a player team classification-based interactive service for soccer game programs in an IPTV system is proposed. FIG. 1 illustrates an overview of this IPTV interaction service system 100.

The interaction is based on the combination of information prepared on the IPTV server side and real time team classification on the IPTV client side and/or in a network middle box (such as the Content and Metadata Sources block 105 shown in FIG. 1). The information on the server side stored as metadata in the MPEG-7 format or any other standard compliant (or proprietary) format. The information describes the playing field, both team multi-histogram models and related media information about the teams. A functional unit within a network middle box or the client side does the real-time team classification based on on-line player/referee feature extraction and the MPEG-7 metadata, presenting the related media information on TV screen for user interaction.

The system can be applied to a number of sports. For example, sports such as soccer, football, basketball, baseball, hockey, cricket and others can utilize the concepts described herein.

FIG. 1 discloses a team classification-based IPTV interaction system 100, in accordance with aspects of the present invention. It is noted that the above specific configuration of FIG. 1 is only one of the many possible configurations. For instance, the playing field information as well as the team player color statistics can be implemented at a network node or the client side as well.

In the embodiment, the user is registered with the IMS infrastructure. The TV content is to be enhanced with metadata information for the playfield description and team target models represented as the multi-color histograms. The IPTV client is enhanced with such a service, which implies an environment to run additional services and respectively execute advanced program code on the IPTV client for on-line player localization (segmentation or tracking).

FIG. 1 further illustrates a sample system architecture. Under this architecture, a basic action flow may include: the user 160, who registers to request an interactive service and makes use of the service. The user 160 is able to click on a player/referee to localize the object of interests (segmentation/tracking) and get the team information and team related metadata on remote control. The IMS-based IPTV Client 155 (such as Set-Top-Box or PDA) is responsible for providing the user 160 with the necessary functionality to take use of the interaction, e.g., real time player/referee localization and viewing the additional content.

The IPTV Service Control Function 150 manages all user-to-content and content-to-user relationships and controls the Content Delivery and Storage 140 and the Content Aggregator 110. The IPTV Application Function 145 supports various service functions and provides an interface to the user 160 to notice the IPTV service information and accept the service request of the user (such as registration or authentication). The IPTV Application Function 145, in conjunction with the Service Control Function 150 provides users with the value added services they request.

The Content Preparation 130 sends a content distribution request to the Content Delivery Control 135. The Content Delivery Control 135 produces a distribution task between Content Preparation 130 and the Content Delivery and Storage 140 according to the defined distribution policy when it receives the request of content distribution. The Content Delivery and Storage 140 delivers aggregated and metadata-enhanced content to the user 160, and may perform player localization and team classification in implementations where these task are not performed at the IPTV Client 155.

The Content Aggregator 110 links the content 120 to the metadata 125 via the Authoring Tool 115 and aggregates content that is enhanced with metadata information for interactive service purposes. The Authoring Tool 115 runs play field learning and team model acquisition and generates the MPEG-7 metadata.

Although the present invention targets interactive services in IPTV systems, the invention is not so limited. The proposed scheme can be used in other video delivery systems with improved accuracy and low computational complexity.

The player/referee localization can be performed in a number of ways. For example, various methods for locating the players/referees can be split in two groups. The first group makes use of fixed cameras (usually calibrated in advance) in a controlled environment. Such a technique is taught by M. Xu, J. Orwell, G. Jones, "Tracking football players with multiple cameras". ICIP 2004, pp. 2909-2912, the content of which is incorporated herein by reference. The second group uses only regular broadcasting videos. While the former can provide better performance, the latter are more flexible. In the second group, difficulties in localization can be overcome by finding the playfield first, using color segmentation and post-processing with morphological operations, such as connected component analysis, in order to limit the search area.

Figure 2:
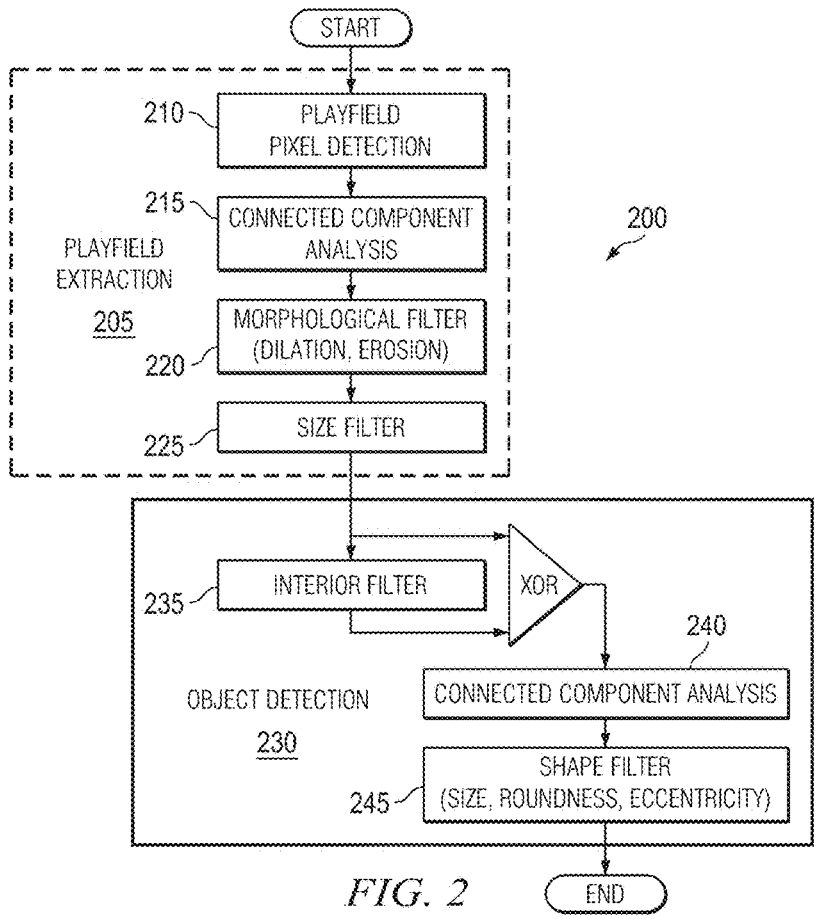
FIG. 2 illustrates a flow diagram for playfield model-based player/referee localization, according to one embodiment of the present invention.

FIG. 2 shows a typical framework for playfield model-based player/referee localization. This figure illustrates playfield model-based player/referee localization, according to embodiments of the present invention. Team classification of player/referee attempts to distinguish each person as Team A or Team B or Referee. While the discussion is related to a player/referee, it should be understood that the invention can be utilized to recognize other objects as well. These objects can be people, such as player, referee, coach, commentator, mascot, fan or other. Alternatively, the object can be a non-human animal, such as a horse in a horse race or a mascot animal at a college football game, or an inanimate object such as a ball, a field indicator or any of the other innumerable objects at a sporting event.

The issues for the localization task are selection of features and the clustering method for matching. In one aspect, the present invention improves the efficiency of feature extraction and discrimination in histogram matching simultaneously. Embodiments adopt a multi (e.g., two)-histogram based matching method to classify the players and referees in game videos.

Figure 3:
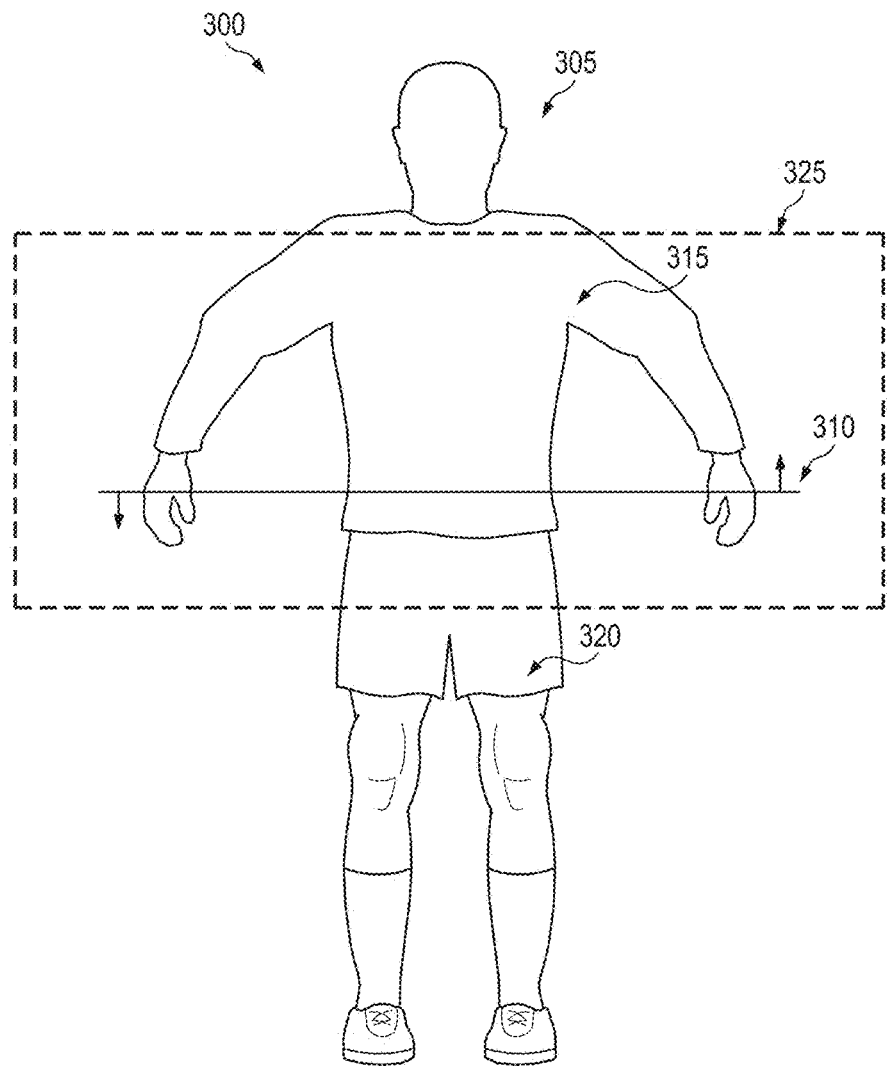
FIG. 3 illustrates an example image of a vertical cutting line in a player blob, according to one embodiment of the present invention.

FIG. 2 shows a typical framework for playfield model-based player/referee localization. As illustrated in diagram 200, the framework can be divided into two portions, playfield extraction 205 and object detection 230. The next step, discussed with respect to the diagram of FIG. 3, is object classification.

The playfield extraction 205 includes playfield pixel detection 210, connected component analysis 215, morphological filtering (e.g., dilation, erosion) 220 and size filtering 225. Further details on playfield extraction will now be discussed.

The playfield can be used for analyzing several types of sports videos, such as soccer, football, baseball and tennis. For example, the playfield is grass for a soccer, baseball or football game. While the color of grass is generally green, this color can vary depending on the individual playfield, the presence of shadows or the viewing angle. In another example, the playfield is ice for a hockey game, but similar issues will occur.

Embodiments of the invention will now be described with to respect soccer. It is understood that the same concepts apply to other sports as well.

Due to the nature of the soccer game, there are many wide shots where the majority of the image is the playfield. Based on this observation, an unsupervised segmentation technique can obtain the playfield model. However, the playfield area in any frame is not always big enough to make the assumption of dominant color valid. Therefore, supervised methods for learning the playfield model can be used. A drawback of the supervised methods is the requirement of many labeled data, where hand-labeling is tedious and expensive.

In one embodiment, two options are defined. The first option is a small set of labeled data, i.e., the pixels in a given playfield area, is used to generate a rough playfield model with a single Gaussian or a mixture of Gaussian distributions (for the latter one, more labeled data is compulsory). Then, this model can be modified by collecting more playfield pixels based on an unsupervised method using dominant color detection.

In a second option, one frame, where the dominant color assumption is satisfied, is selected. Then its dominant mode is extracted to generate the initial playfield model. Like the first option, this model can be modified by collecting more playfield pixels based on dominant color detection.

The determination of the playfield model is discussed in greater detail in Provisional Patent Application Ser. No. 61/144,386, which is incorporated herein by reference. Further information can be derived from that application.

Players and referees are foreground objects in the soccer playfield. Since soccer is a spectator sport, the play fields, the lines, the ball and the uniforms of the players and referees are designed to be visually distinctive in color. Therefore, the framework in FIG. 2 can be applied for extraction or detection of player/referee blobs from the playfield.

The object detection 230 includes interior filtering 235. A comparison is made between the pre-filtered and the filtered image data as illustrated by the XOR gate. The result can be thought of as the image without the background. This result can then go through connected component analysis 240 and shape filtering 245. The shape filtering can deal with size, roundness and/or eccentricity, as examples.

Given the segmented blobs for players and referees, each will be labeled with an identity of Team A, Team B or Referee. Sometimes two team goalies are classified as well. In order to do that, each team player or referee's appearance model is used to acquire by learning the labeled data.

Since the player's jersey is mostly discriminate from the shorts and the former occupies more area in the player blob, two color histograms can be used to represent the player's appearance model, with one being given a bigger weight in histogram matching. In this context, the terms jersey and shorts are used to denote the upper portion of the player and the lower portion of the player regardless of whether the player is actually wearing a jersey or shorts. For example, the term "shorts" includes shorts worn by a basketball and also pants worn by a baseball player. Similarly, the term "jersey" can be applied to both teams in a "shirts v. skins" game.

FIG. 3 illustrates a player blob 300 that can be used in the discrimination process. In this example, a soccer player 305 wears a jersey 315 and shorts 320. A rectangle 325, approximately centered at the boundary between the jersey 315 and shorts 320, is used to distinguish the player. A vertical cutting line 310 is adjusted to be aligned between the jersey/shorts boundary.

The separation of the jersey 315 and shorts 320 in each player/referee blob 300 into upper and lower parts (here it is assumed the player stands approximately upright) is based on a discriminate function. Given a rectangle 325 of size w×h (width w and height h), the cutting line 310 is searched around the middle position which maximizes the objective function $$\rho[p,q] = 1.0 - \Sigma_{u=1}^{m} \sqrt{p_u q_u}, \qquad (1)$$

where the $p_u$ is the color histogram of the upper part and the $q_u$ is the color histogram of the lower part. m is the number of bins in the histogram. In one embodiment, a histogram with 8×8×8 bins of color RGB color space can be used. The measure in equation (1) is called the Bhattacharyya distance.

To accelerate the above process, the color histogram for each row in the search gap of the target window (rectangle 325) is calculated and so only the row histogram is added or subtracted from histograms of the upper or lower part respectively when the cutting line 310 scrolls up and down one row per iteration. Since the position range of the cutting line 310 is narrow, an exhaustive search is feasible to find the best cutting line that discriminates most of the upper part from the lower part. For example, the search gap my include a range of less than 25% of the rows, or preferably, less than 10% of the rows.

Eventually two color histograms are utilized for player/referee labeling. In appearance model learning, two histograms are generated and saved as $p_{1i}$ and $p_{2i}$ for each team or referee, i.e., i=Team A, Team B and Referee. If multiple samples for each type (either team player or referee), obtained from either manually segmented or playfield-model-based segmentation, are applied, all the pixels in the upper part (jersey mainly) and the lower part (shorts mainly) of the segmented blob are collected to build the upper and lower color histogram respectively. Eventually both histograms are normalized.

In testing or running the classification, for an unknown blob (extracted from playfield-model-based segmentation process) in the soccer game videos two normalized color histograms for jersey and short regions are built as well, i.e., $q_1$ and $q_2$, then its label i is estimated by minimizing a weighted Bhattacharyya distance as $$\min_{i} \rho[(p_{1i}, p_{2i}), (q_1, q_2)] = \qquad (2)$$
$$w \cdot \left(1.0 - \sum_{u=1}^{m} \sqrt{p_{1u} q_{1u}}\right) + (1-w) \cdot \left(1.0 - \sum_{u=1}^{m} \sqrt{p_{2u} q_{2u}}\right),$$

where w is the weight (0<w<1.0, suggested as 0.7).

The discussion above provides details on the determination of which team a player is associated with. With additional processing, the identity of the player may also be determined. For example, number recognition techniques could be used to locate and identify the player's number. In a typical game, the roster of the players is known so that a comparison could be made between the known player information and the derived player information.

A specific example of an interactive television system will now be described with respect to FIGS. 4-7. This example provides only one of the many ways that the concepts described herein could be implemented.

This scenario describes a rich media interactive television application. It focuses on new concepts for interaction with moving objects in the sport programs. Based on direct interaction with certain objects, the viewer can retrieve rich media content about objects of his choice.

The interaction is based on the combination of information prepared on the IPTV server side and real time team classification on the IPTV client side. The information on the server side is stored as metadata in the MPEG-7 format and describes the play field, team templates and related media information about the teams. The client side does the real time object processing and, based on the MPEG-7 metadata to do the team classification, presents the related media information on a screen for user interaction.

The TV content is enhanced with metadata information for the description of the field and team templates represented as the color histogram. The user has to be registered with the IMS infrastructure. The IPTV client has to be enhanced with such a service, which implies an environment to run additional services and respectively execute advanced program code on the IPTV client for content processing and object highlighting. Charging can be used for transaction and accounting.

Figure 4:
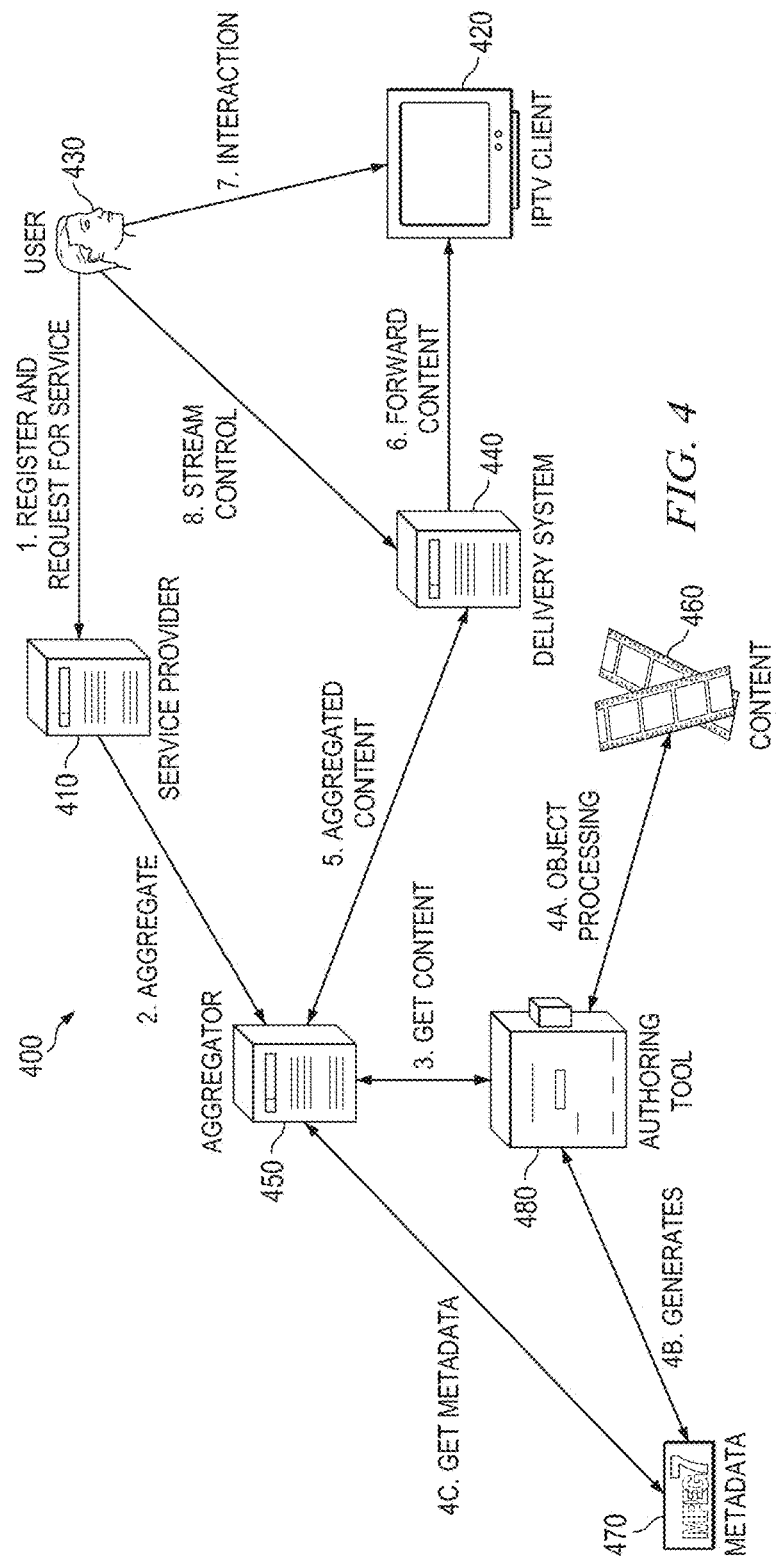
FIG. 4 illustrates block diagram of a interactive television system, according to one embodiment of the present invention.

FIG. 4 illustrates a block diagram showing a specific configuration of one interactive television system 400. As can be seen, this system implements many of the concepts discussed above with respect to FIG. 1.

Referring now to FIG. 4, the service provider 410 offers an interactive channel and metadata information. The service provider 410 hosts the needed network entities and provides the necessary infrastructure. An IMS charging system provides the service provider 410 with functionality for accounting. This feature allows the service provider 410 to fund the offered service.

The IPTV client 420, for example a set top box (STB), is responsible to provide the viewer 430 with the functionality to make use of the interaction, in terms of real time object processing, to spot high lighting of objects containing additional content, to select objects and to view additional content. The IMS based IPTV client 420 is enabled with techniques such as real time object processing for providing the interactive service. In another example, if the video content is not enhanced with the metadata information, the IPTV client 420 can provide a user interface to the user 430 for collecting the team templates.

The user 430 makes use of the service by selecting objects, and consuming additional content. The delivery system 440, typically owned by the service provider 410, delivers aggregated and metadata-enhanced content to the user 430, provides trick functions and highly efficient video and audio coding technologies.

The content aggregator 450 links the content 460 to the metadata 470 via the authoring tool 480. This aggregator 450 aggregates content which is enhanced with metadata information for interactive service purposes. The content aggregator 450 provides the delivery system 440 with aggregated content and attaches them with enhanced content. Therefore MPEG7 as standard for multimedia metadata descriptions should be considered.

The authoring tool 480 disposes algorithms for field learning and team template acquisition in video streams and an MPEG-7 metadata generator.

In operation of the system 400, the user 430 registers with the service provider 410 and requests the desired service. For this example, the user 430 is able to click on a player to start tracking the player and get the team information about his/her team information and related video by clicking on the appropriate colored button on remote control.

In response to the request from the user 430, the service provider 410 causes the aggregator 450 to prepare the enhanced content. In doing so, the aggregator 450 communicates with the authoring tool 480, which processes the content image and enhances the content 460 with the metadata 470. The aggregator 450 can then provide the aggregated content to the delivery system 440.

The delivery system 440 forwards the enhanced content to the IPTV client 420, which interacts with the user 430. The user 430 also provides stream control to the delivery system 440, either via the IPTV client 420 or otherwise.

Features of each of the functional units shown in FIG. 4 will be described in the following paragraphs.

Figure 5:
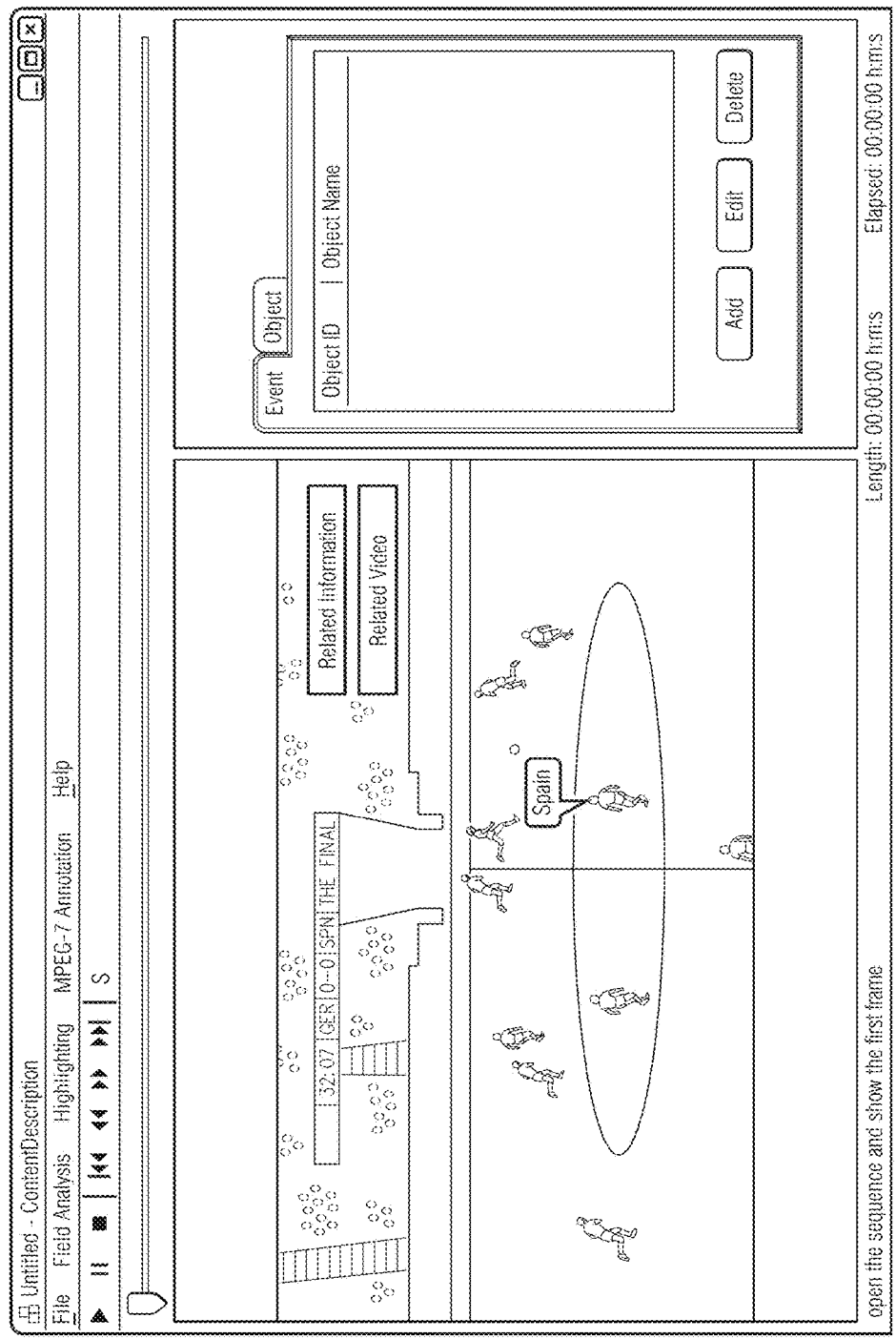
FIGS. 5-7 illustrate screen shots of an example of an interactive television system.
Figure 6:
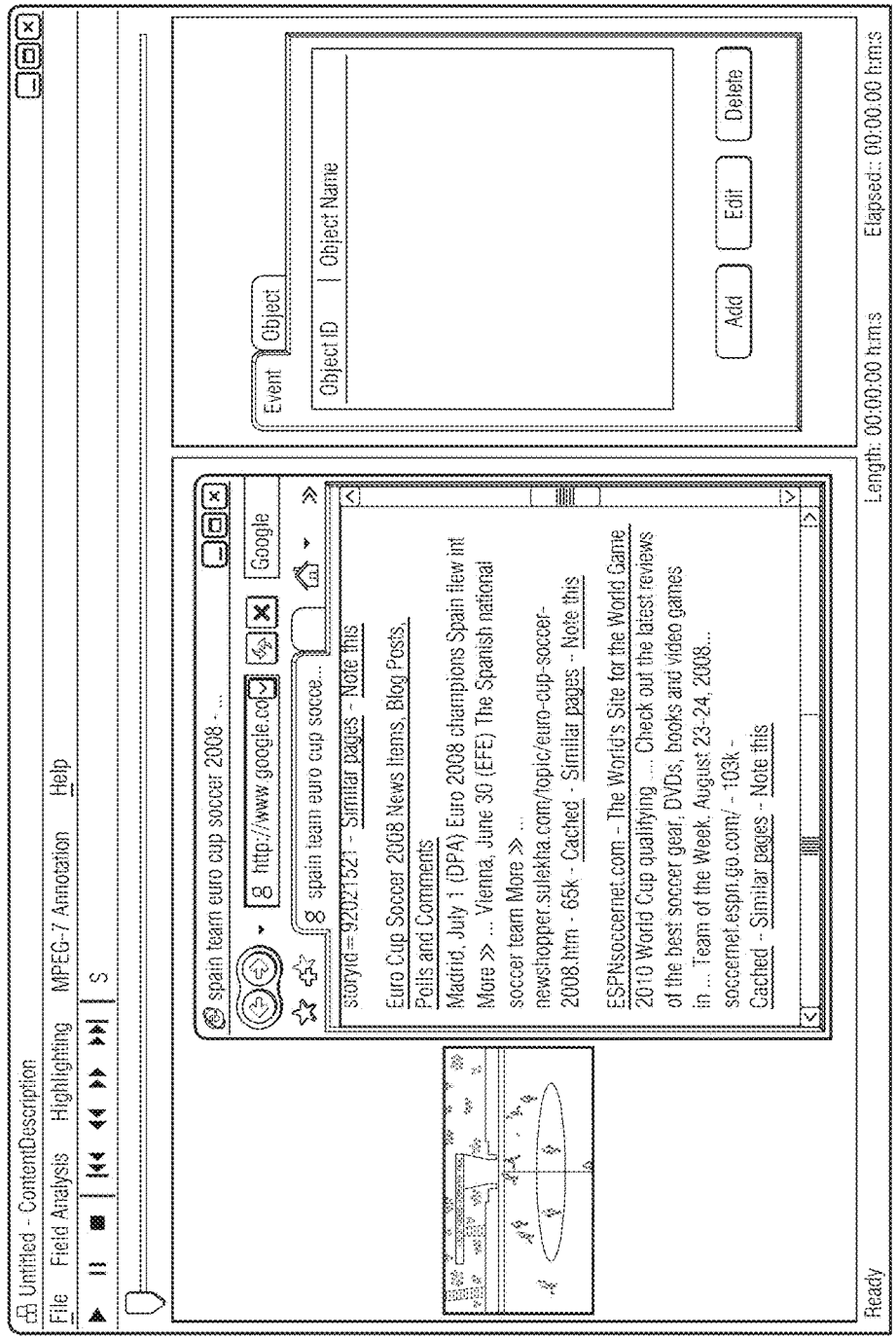
Figure 7:
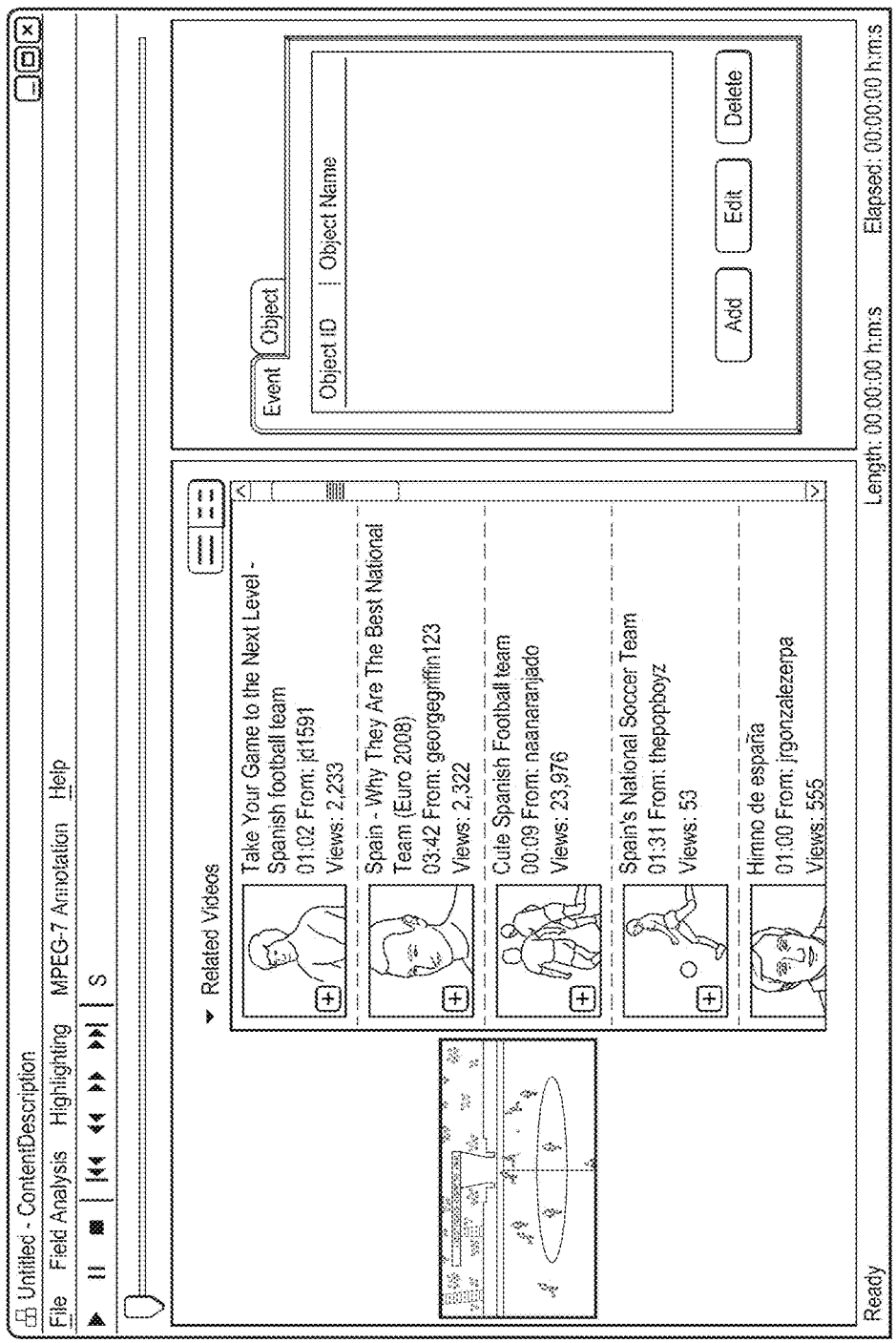

Features of the service provider 410 include:
Interpret metadata provided by the content provider to inject interactive elements
Connect to IMS network (e.g., over the ISC interface)
Have awareness of the content
Provide service triggering based on a Public Service Identifier (PSI)
Accept and execute requests from user 430
Control the aggregator 450 in case of inband signaling
Control the delivery system 440 for forwarding the content from the aggregator 450 to the IPTV client 420
Features of the IPTV client 420 include:
IMS enabled client (STB)
Audio and video rendering support
Basic codec support such as AC3 for audio and H.264/VC1 for video
RTP de-packetizing (based on RTP profiles) support for supported audio and video codecs (e.g., H.264)
Real time object processing for object detection and object tracking
Application logic (data engine) processing the segmentation and editing of MPEG-7 metadata information (MPEG7 Decoder)
Overlay-rendering support (display engine) for object highlighting as shown in the sample and interactive menu.
Display engine for additional content related to the selected object (picture in picture rendering, online shop, web portal, reuse of MHP, others)
Features of the user 430 include:
make use of the IMS enabled client 420
request the content
needs trick modes for stream control
select the video object via remote control
retrieve additional information
Features of the delivery system 440 include:
Provide content delivery to the IPTV client 420 via unicast or multicast channel
Transcode
Adapt content
Connect to the IMS core
Enable the IPTV client 420 to trigger media processing and content delivery
Support for trick functions; RTSP support
Inband (DVB-MPEG TS multiplex) and/or outband (linked content available on media ports) transport of metadata
Features of the aggregator 450 include:
Aggregate the highlight streams enhanced with metadata
Interface with Authoring Tool 480 (application server)
Prepare aggregated content for delivery
Features of the authoring tool 480 include:
Be linked to content
Run field learning algorithms to learn the field.
Run the object detection algorithm to collect the team template information.
Generate MPEG-7 metadata which holds information about the field and team templates FIGS. 5-7 provide examples of screen shots from the user's perspective. For example, in FIG. 5, a player is identified (in this case as being from Spain). This identification can occur by the user clicking on the player.

In FIG. 6, a new window was opened in response to the indication of the player from Spain. In this example, a search was performed for websites related to the Spanish team. Similarly, FIG. 7 shows an example where a search was performed for videos related to the Spanish team. While a general Internet search is illustrated, it is understood that proprietary information could be provided as well. For example, the window can provide a list of highlight videos, statistics or other information about the team. This information could be publicly available or available only to subscribers.

Aspects of the invention have been described in the context of specific examples. It is understood, however, that the invention is not limited to just these examples. For example, the invention has been discussed with respect to video images. The concepts described herein could equally apply to still images. The concepts have also been applied to sports images. Any other images, whether photographic, drawn, computer generated or other, can also utilize concepts described herein.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An image processing method comprising:
receiving an image;
locating a foreground object within a frame of the image, the foreground object being depicted by a plurality of pixels;
determining an area around the foreground object within the frame of the image;
dividing, using a processor, the area into at least first and second portions based upon image color information within the area, wherein the first portion comprises a first group of the pixels including a portion of the foreground object and the second portion comprises a second group of the pixels including a different portion of the foreground object, the first group of the pixels having a first color characteristic and the second group of the pixels having a second color characteristic different from the first color characteristic; and
after the dividing, classifying the foreground object within the frame of the image based upon the first color characteristic of the first portion of the area and the second color characteristic of the second portion of the area, the classifying being performed by comparing the first color characteristic with first stored color characteristic information and comparing the second color characteristic with second stored color characteristic information.

2. The method of claim 1, wherein receiving the image comprises receiving a video image.

3. The method of claim 2, wherein receiving the image comprises receiving an internet protocol television (IPTV) image.

4. The method of claim 1, wherein dividing the area into at least first and second portions comprises locating a line at a color boundary within the area.

5. The method of claim 4, wherein the area comprises a rectangle and the line comprises a line such that the area is divided into only first and second portions.

6. The method of claim 1, wherein the first portion is represented by a first color histogram and the second portion is represented by a second color histogram and wherein the area is divided into the first and second portions based upon the first and second color histograms.

7. The method of claim 6, wherein dividing the area into at least first and second portions comprises locating a line at a color boundary utilizing a Bhattacharyya distance.

8. The method of claim 7, wherein locating the line comprises utilizing a weighted Bhattacharyya distance.

9. The method of claim 6, wherein the area comprises a plurality of rows and wherein dividing the area into at least first and second portions comprises calculating a plurality of row color histograms for rows in the area and comparing each row color histograms with first and/or second color histograms to determine a location of a boundary between the first portion and the second portion.

10. The method of claim 9, wherein the area comprises a rectangle and wherein calculating a plurality of row color histograms comprises calculating row color histograms for only a small number of rows, the small number of rows comprising less than ten percent of a total number of rows in the rectangle.

11. The method of claim 1, wherein the foreground object comprises a sports player having a jersey and shorts and wherein classifying the foreground object comprises classifying the foreground object based upon a color of the jersey and a color of the shorts.

12. The method of claim 1, wherein classifying the foreground object comprises determining an affiliation of the foreground object with an organization.

13. A method for classifying individuals in a video, the method being performed on a processor and comprising:
receiving a video image;
locating a player/referee within the video image, the player/referee comprising a plurality of pixels in a frame of the video image;
determining an area around the player/referee, wherein the area distinguishes the player/referee from other players/referees in the video image;
dividing the area into an upper portion that includes a first group of the pixels that depict an upper portion of the player/referee and a lower portion that includes a second group of the pixels that depict a lower portion of the player/referee;
determining color information for the upper portion and color information for the lower portion;
performing a first comparison of the color information for the upper portion with known top color information;
performing a second comparison of the color information for the lower portion with known bottom color information; and
identifying a characteristic of the player/referee based upon the first comparison and the second comparison, the characteristic related to affiliation.

14. The method of claim 13, wherein the video image is a sports video, wherein the known top color information comprises jersey color information and wherein the known bottom color information comprises shorts color information.

15. The method of claim 14, wherein identifying the characteristic of the player/referee comprises determining a team of the player/referee.

16. The method of claim 13, wherein identifying the characteristic of the player/referee comprises determining an identity of the player/referee.

17. The method of claim 13, wherein receiving the video image comprises receiving a broadcast video image and wherein identifying the characteristic of the player/referee is performed substantially in real-time with the broadcast video image.

18. An interactive television system comprising:
an authoring tool configured to
receive a broadcast video image,
locate a plurality of pixels depicting an object within the broadcast video image,
determine an area around the object that segments the object from other objects in the broadcast video image,
divide the area around the object into a first group of the pixels including a portion of the object and a second group of the pixels including a different portion of the object,
determine first color information related to the first group of the pixels and second color information related to the second group of the pixels, and
generate metadata including an affiliation of the object based upon the first color information within the first group of the pixels and the second color information within the second group of the pixels;
an aggregator configured to receive the broadcast video image and metadata and generate a video stream that is enhanced with the metadata; and
a delivery system configured to transmit the video stream that is enhanced with the metadata.

19. The interactive television system of claim 18, further comprising an interactive television client coupled to receive the video stream that is enhanced with the metadata from the delivery system.

20. The interactive television system of claim 18, wherein the broadcast video image comprises an IPTV image.

21. An apparatus comprising:
a microprocessor; and
a non-transitory computer-readable storage medium with an executable program stored thereon, wherein the executable program is configured to instruct the microprocessor to:
locate a foreground object within a frame of an image, the foreground object being depicted by a plurality of pixels;
determine an area around the foreground object within the frame of the image;
divide the area into at least first and second portions based upon image color information within the area, wherein the first portion comprises a first group of the pixels including a portion of the foreground object and the second portion comprises a second group of the pixels including a different portion of the foreground object, the first group of the pixels having a first color characteristic and the second group of the pixels having a second color characteristic different from the first color characteristic; and
classify the foreground object within the frame of the image based upon the first color characteristic of the first portion of the area and the second color characteristic of the second portion of the area, wherein classifying the foreground object comprises comparing the first color characteristic with first stored color characteristic information and comparing the second color characteristic with second stored color characteristic information.

* * * * *